(12) United States Patent
Glas et al.

(10) Patent No.: US 8,650,843 B2
(45) Date of Patent: Feb. 18, 2014

(54) METHOD OF PACKAGING PRODUCTS

(75) Inventors: Franz Glas, Rott am Inn (DE); Walter Föstl, Soyen (DE)

(73) Assignee: Alpma Alpenland Maschinenbau GmbH, Rott Am Inn (DE)

(*) Notice: Subject to any disclaimer, the term of this patent is extended or adjusted under 35 U.S.C. 154(b) by 386 days.

(21) Appl. No.: 13/020,899

(22) Filed: Feb. 4, 2011

(65) Prior Publication Data

US 2012/0198798 A1     Aug. 9, 2012

(51) Int. Cl.
*B65B 11/08* (2006.01)
*B65B 11/12* (2006.01)
*B65B 49/08* (2006.01)

(52) U.S. Cl.
USPC .............................. 53/463; 53/466

(58) Field of Classification Search
CPC ...... B65B 49/08; B65B 11/08; B65B 11/004; B65B 11/12
USPC .................... 53/461, 463, 464, 466
IPC .................. B65B 49/08, 11/08, 11/12
See application file for complete search history.

(56) References Cited

U.S. PATENT DOCUMENTS

| | | | | |
|---|---|---|---|---|
| 2,214,997 A | * | 9/1940 | Guyer | 53/464 |
| 2,307,124 A | * | 1/1943 | Guyer et al. | 53/464 |
| 2,323,467 A | * | 7/1943 | Guyer | 53/464 |
| 2,968,396 A | | 1/1961 | Pratt | |
| 2,998,880 A | | 9/1961 | Ladd | |
| 3,291,377 A | | 12/1966 | Eggen | |
| 3,354,602 A | * | 11/1967 | Doets | 53/463 |
| 3,530,640 A | * | 9/1970 | Hoffmann | 53/207 |
| 3,927,505 A | | 12/1975 | Bemiss | |
| 4,196,563 A | * | 4/1980 | Gabrielson et al. | 53/207 |
| 4,993,213 A | * | 2/1991 | Kobler et al. | 53/463 |
| 5,365,721 A | * | 11/1994 | Focke | 53/463 |
| 5,622,432 A | | 4/1997 | Zicker | |
| 5,865,941 A | * | 2/1999 | Focke et al. | 156/443 |
| 6,640,522 B2 | | 11/2003 | Antoniazzi et al. | |

FOREIGN PATENT DOCUMENTS

| | | |
|---|---|---|
| CH | 70842 | 6/1915 |
| CH | 395844 | 1/1966 |
| CH | 407868 | 9/1966 |
| DE | 118553 | 12/1899 |
| DE | 1536188 | 1/1970 |
| DE | 2558214 | 4/1979 |

(Continued)

*Primary Examiner* — Stephen F Gerrity

(57) ABSTRACT

A method of packaging products, in particular moist products, wherein an areal packaging material is positioned at the outer surfaces of a product while forming fold lines such that the product is completely surrounded by packaging material. The packaging material is first folded adjacent to a lower side region while forming side surface regions and end face regions such that a container open at one side is formed. Sections of the packaging material that project beyond the rim of the container open at one side in the regions of mutually oppositely disposed product side surfaces are folded so far over one another while covering the product upper side of the product until they contact one another in order then to be sealed with one another in a first sealing region. In a second and third sealing region, sections of the packaging material which project outwardly from the product in the region of mutually oppositely disposed end face regions are sealed with such regions of the packaging material which project outwardly from the product from the upper side region and from the side surface regions of the packaging material.

7 Claims, 4 Drawing Sheets

(56) References Cited

FOREIGN PATENT DOCUMENTS

Figure 1:
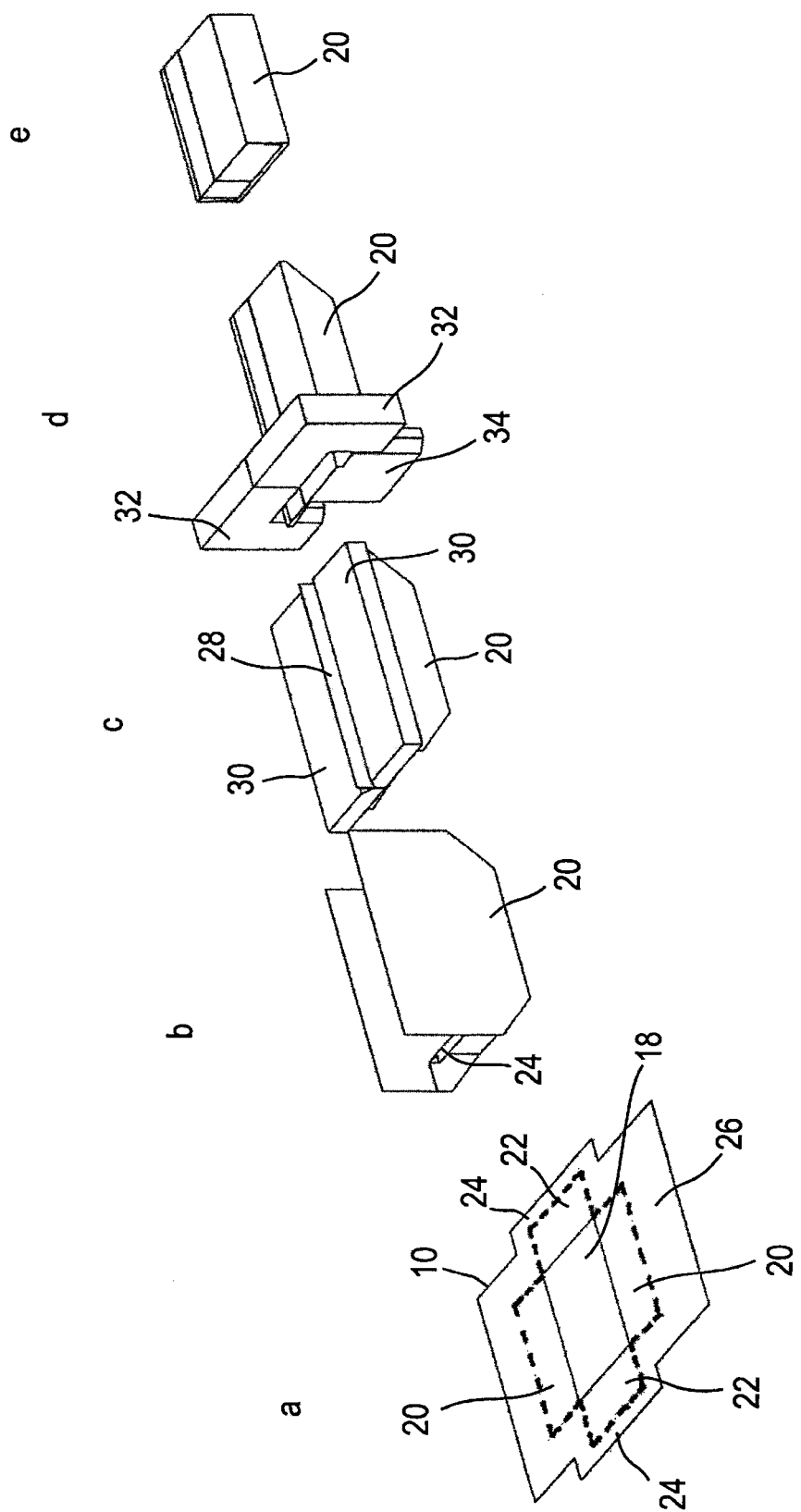

| | | |
|---|---|---|
| DE | 2658631 | 7/1993 |
| DE | 4202647 | 8/1993 |
| DE | 4320309 | 1/1994 |
| DE | 4409255 | 9/1995 |
| DE | 19706825 | 9/1998 |
| DE | 20113173 | 11/2001 |
| DE | 10100085 | 7/2002 |
| DE | 102004055007 | 5/2006 |
| DE | 60207901 | 8/2006 |
| DE | 202007008282 | 9/2007 |
| DE | 102009014245 | 9/2010 |
| EP | 0446005 | 9/1991 |
| EP | 0453408 | 10/1991 |
| EP | 0494582 | 2/1995 |
| EP | 0666223 | 8/1995 |
| EP | 1069984 | 10/2002 |
| EP | 1121301 | 2/2003 |
| EP | 1063174 | 4/2004 |
| EP | 1309486 | 3/2005 |
| EP | 1181191 | 4/2006 |
| EP | 1618052 | 9/2006 |
| EP | 1783059 | 5/2007 |
| EP | 1288139 | 7/2007 |
| EP | 1939106 | 3/2009 |
| EP | 1382543 | 9/2009 |
| GB | 920589 | 3/1963 |
| GB | 1364822 | 8/1974 |
| GB | 2337242 | 11/1999 |
| GB | 2337243 | 11/1999 |
| JP | 04201805 A * | 7/1992 |
| JP | 2004-248637 | 9/2004 |
| WO | 93/11054 | 6/1993 |
| WO | 96/23711 | 8/1996 |
| WO | 99/35057 | 7/1999 |
| WO | 99/39989 | 8/1999 |
| WO | 99/47431 | 9/1999 |
| WO | 99/54120 | 10/1999 |
| WO | 99/65788 | 12/1999 |
| WO | 00/26101 | 5/2000 |
| WO | 02/062575 | 8/2002 |
| WO | 03/064279 | 8/2003 |
| WO | 03/080447 | 10/2003 |
| WO | 03/091104 | 11/2003 |
| WO | 2004/007292 | 1/2004 |
| WO | 2005/068173 | 7/2005 |
| WO | 2006/100084 | 9/2006 |
| WO | 2007/088005 | 8/2007 |
| WO | 2008/041082 | 4/2008 |
| WO | 2008/043375 | 4/2008 |
| WO | 2008/087510 | 7/2008 |
| WO | 2008/110302 | 9/2008 |
| WO | 2009/077724 | 6/2009 |
| WO | 2010/000699 | 1/2010 |
| WO | 2010/046623 | 4/2010 |
| WO | 2010/060394 | 6/2010 |
| WO | 2010/083917 | 7/2010 |
| WO | 2010/084336 | 7/2010 |
| WO | 2010/149397 | 12/2010 |
| WO | 2011/004156 | 1/2011 |

* cited by examiner

METHOD OF PACKAGING PRODUCTS

FIELD

The present disclosure relates to a method of packaging products, in particular moist products, wherein an areal packaging material is positioned at the outer surfaces of a product while forming fold lines such that the product is completely surrounded by the packaging material, wherein the packaging material is first folded adjacent to a lower side region while forming side surface regions and end face regions such that a container open at one side is formed.

BACKGROUND

Methods are used to package products or piece goods of the most varied type with paper or film in an at least largely automated manner in order to offer them for sale in a packaged state.

Two aspects are in particular disadvantageous in these methods which are, for example, used for the packaging of pieces of butter, cream cheese or other pasty products. The aspects are due to the fact that the packaging material is applied by folding processes only to the outer surfaces of a product without being sealed in any manner. On the one hand, this has the result that a purchaser of a product packaged in this manner can never be sure that the packaging was not opened and closed again by unauthorized persons before the purchase and that a contamination of the product may have occurred in this manner. On the other hand, there is a risk on the packaging of moist products, for example of cream cheese, that liquid, in particular whey, leaks out of the packaging since no drop-tight closure of the product with packaging material can be achieved by the known types of folding packaging.

SUMMARY

It is accordingly an object of the disclosure to further develop a method such that at least largely drop-tight types of folding packaging can be produced with an economic effort which is as small as possible, with in particular a largely automated packaging procedure being possible.

This object is satisfied in that sections of the packaging material which project beyond the rim of the container open at one side in the region of mutually oppositely disposed product side surfaces are folded so far over one another while covering the product upper side of the product until they contact one another in order then to be sealed with one another in a first sealing region. In a second and third sealing region, sections of the packaging material which project outwardly from the product in the region of mutually oppositely disposed end face regions are sealed with such regions of the packaging material which project outwardly from the product from the upper side region and from the side surface regions of the packaging material.

In accordance with the disclosure, different sealing regions are therefore provided which are arranged so that they are adjacent to one another and/or overlap one another so that ultimately a complete sealing of the packaging results. On the one hand, it is thereby achieved that no moisture, and in particular no whey in the case of the packaging of cream cheese, can leak out of the packaging. On the other hand, it is ensured that the packaging can only be opened if it is simultaneously destroyed so that a purchaser can assume, if the packaging is intact, that the packaging was not opened by unauthorized persons after the packaging procedure ex works.

The first sealing region in accordance with the disclosure in which sections of the packaging material which project beyond the rim of the container open at one side in the region of mutually oppositely disposed side surfaces are sealed with one another can be produced, for example, by a method in accordance with the German patent application DE 10 2004 055 007.7 of the applicant. It is ensured by this process that the product can be packaged without contamination and that the packaging material contacts the product upper side over as full an area as possible while avoiding disturbing air inclusions. Alternatively, however, it is equally conceivable to use other processes to produce the first sealing region.

In accordance with the disclosure, a second and a third sealing region are produced in addition to the first sealing region. In contrast to the first sealing region, the second or third sealing regions do not extend along the upper side of the product, but rather in the region of its end faces. A preferred variant for producing the second and third sealing regions will be explained in further detail in the following.

When a lower side region, a side surface region, an end face region or an upper side region of the packaging material is spoken of within the framework of this application, that region of the packaging material is always named thereby which directly contacts the corresponding side of the product with a fully packed product. To this extent, the dimensions of the side surface regions of the packaging material correspond to the dimensions of the product side surfaces, the dimensions of the lower side region to the dimensions of the product lower side, the dimensions of the upper side region to the dimensions of the product upper side and the dimensions of the end face regions to the dimensions of the product end faces. In contrast to these different regions of the packaging material, within the framework of this application the terms product side surface, produced end face, product upper side and product lower side are used for the different surface regions of the product to be packaged.

In accordance with the disclosure, a parallelepiped or cuboid product is packaged. Other product shapes are, however, also conceivable. In particular, prism shapes having a hexagonal or octagonal base surface are contemplated. In this case, the product side surfaces or the product end faces then at least partly comprise a plurality of surfaces which are adjacent to one another and are located in different planes. It is thus generally not compulsory within the framework of the disclosure that the individual side surface regions and/or end face regions extend within a single plane.

Before the sealing procedure in accordance with the invention is carried out, the packaging material is, as already explained above, folded such that a container open at one side results. This folding can, on the one hand, take place when the product is already located on the packaging material, as is e.g. described in the already mentioned application DE-A-10 2004 055007.7, or the product can be introduced, in particular injected, into the container open at one side after the folding procedure.

The three sealing regions in accordance with the disclosure can be produced in any desired order; it is in particular possible to produce the second and third sealing regions before the first sealing region was produced. It is, however, preferred if the first sealing region is produced first and subsequently then the second and third sealing regions. The production of the second and third sealing regions can in this respect preferably take place simultaneously.

The formation of the second and third sealing regions which ultimately produce a drop-tight packaging becomes possible in that regions of the packaging material which project beyond its end face regions project outwardly from the product and are not folded inwardly toward the surface of the product, as with types of folding packaging known from the prior art. These outwardly projecting regions can then namely be used for sealing with other regions of the packaging material which project outwardly from the product from the upper side region and from the side surface region of the packaging material.

It is particularly preferred if the second sealing region extends along three sides of the one end face region, with these three sides being adjacent to the upper side region and to the two side surface regions. Equally, the third sealing region can then extend along three sides of the other end face region, with these three sides also being adjacent to the upper side region and to the two side surface regions. Those sides of the end face regions which are associated with the second and third sealing regions are therefore those sides with which the end face regions of the packaging material are not adjacent to the lower side region of the packing material, which is sensible since the end face regions are anyway connected to the lower side region of the packaging material in a drop-tight manner by a fold line so that no sealing is necessary there.

It is thus achieved by the production of the second and third sealing regions that a respective completely peripheral drop-tight connection to adjacent regions of the packaging material is produced at the mutually oppositely disposed product end faces so that a packaging which is drop-tight overall can be obtained together with the first sealing region extending along the product upper side.

The packaging material preferably has a length in a first direction before the folding procedures which is larger than twice the sum of the width and the height of the product. In a second direction extending perpendicular to the first direction, the packaging material advantageously has a length which is larger than the sum of the length and twice the height of the product. It is achieved by these dimensions that, after the covering of the product upper side by the packaging material sufficient packaging material still projects from the product in all required directions, said product being able to be sealed with one another in accordance with the invention. A certain excess of packaging material is therefore directly provided here to be able to produce the sealing regions. In addition, it becomes possible by the named dimensions of the packaging material to fold it into an upwardly open container which can completely receive the product to be packaged. With specific types of packaging known from the prior art (e.g. types of butter packaging with end face folding), this is not possible, for example, since packaging material has to be folded there from the product upper side and from the product lower side onto the product end face to cover the product end faces. This is not necessary in accordance with the disclosure since a complete covering of the product end faces can already be achieved by an upwardly occurring folding of the end face region, starting from the lower side region of the packaging material.

It is particularly advantageous if a respective region of the packaging material adjacent to each of the end face regions projects outwardly from the product in the plane of the upper side region after the production of the container open at one side and before the sealing of the second and third sealing regions. In accordance with packaging principles known from the prior art, it would have been more obvious to fold such a region inwardly onto the product upper side. A region is, however, produced by the atypical folding of the named region outwardly in accordance with the disclosure which can subsequently be sealed with such regions of the packaging material which project outwardly from the upper side region of the packaging material. It is, however, not compulsory in accordance with the disclosure that the named region adjacent to the end face region is located in the plane of the upper side region. It would alternatively also be possible that this region extends away from the product along any desired other plane. It only has to be ensured that the regions of the packaging material to be connected to one another are located within a common plane directly before the sealing procedure.

The disclosure makes it possible in a particularly advantageous manner that all sealing procedures can be carried out between at least one sealing jaw and at least one counter-sealing jaw. It is therefore not necessary to carry out a sealing procedure against the product itself in which the product would act as a counter-sealing jaw. It can be ensured in accordance with the disclosure to this extent that the product is neither deformed by the sealing procedures nor negatively influenced by high sealing temperatures.

The second and third sealing regions are preferably each produced between two outer sealing jaws which are essentially of L shape, on the one hand, and a counter-sealing jaw, on the other hand. The counter-sealing jaw can in this respect correspond with regard to its dimensions to the respective end face region of the packaging material or with the dimensions of the product end face respectively. This variant in accordance with the disclosure will be explained in even more detail within the framework of the description of the Figures.

The packaging material to be used in accordance with the disclosure is advantageously made in one piece and in particular has a cruciform shape in which two side lugs and two end face lugs respectively project in opposite directions from a base region. In this respect, the base region preferably projects beyond the lower side region at all four sides. Alternatively to the named cruciform shape, a rectangular shape of a one-piece packaging material can also be used; in this case, however, more packaging material is then needed.

The packaging material preferably comprises a plastic film having an aluminum portion; however, any other desired materials can also be used at which a sealing procedure can generally be carried out.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 3:
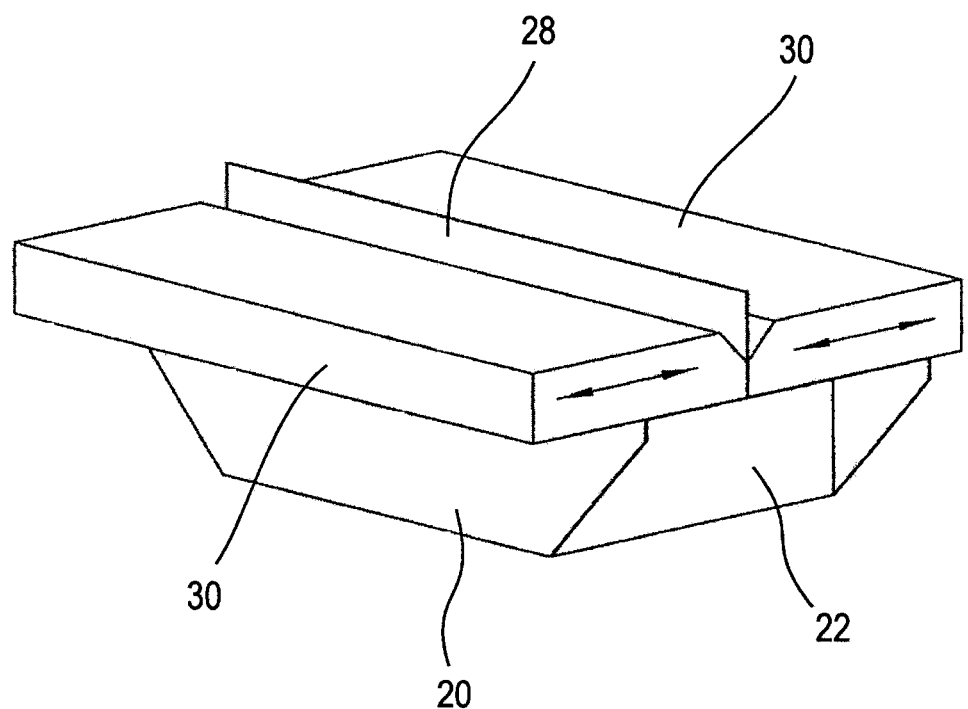
Figure 4:
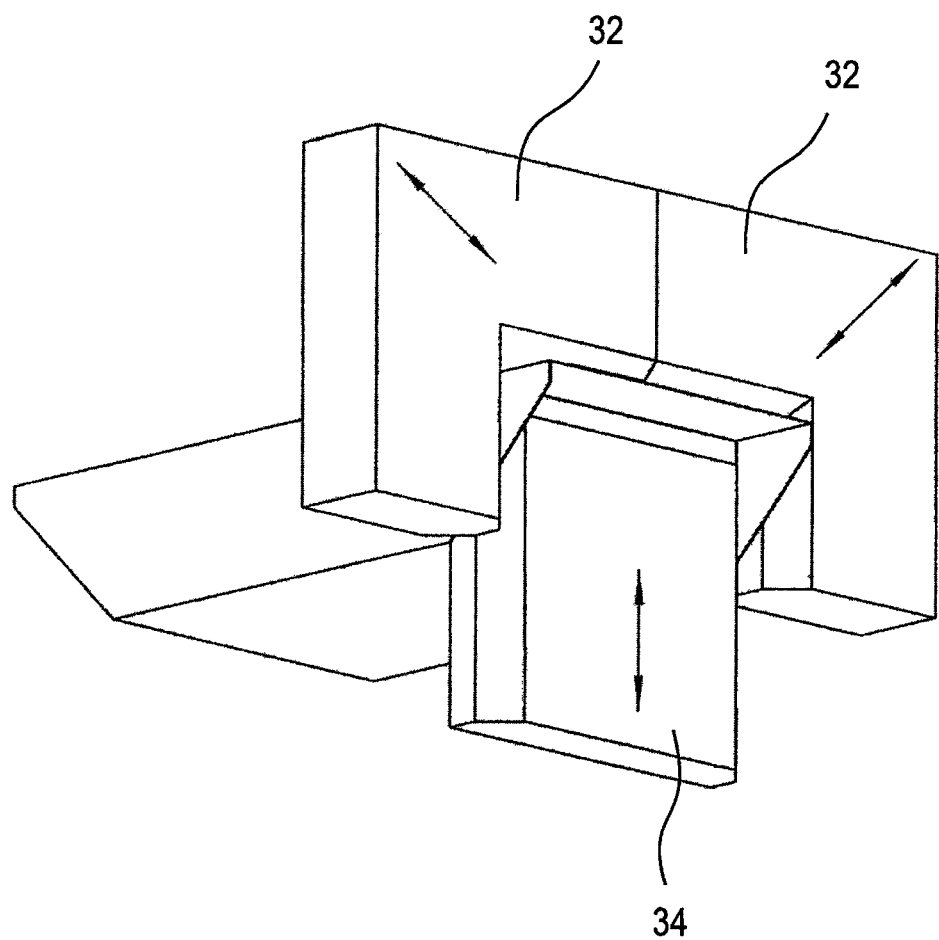

FIGS. 1a-e are schematic perspective views obliquely from above in which a total of five process steps are shown for carrying out a possible method in accordance with the disclosure;

FIGS. 2a-e are representations in accordance with FIG. 1 obliquely from below;

FIG. 3 is a perspective view of a sealing apparatus for producing the first sealing region in accordance with the disclosure; and FIG. 4 is a perspective view of a sealing apparatus for producing the second or third sealing regions in accordance with the disclosure.

Corresponding reference numerals indicate corresponding parts throughout the several views of the drawings.

DETAILED DESCRIPTION

Example embodiments will now be described more fully with reference to the accompanying drawings.

FIGS. 1a, 2a show a cruciform pre-cut part of a packaging material 10 which, in accordance with FIG. 2a, comprises a rectangular base region 12, two side lugs 14 projecting in opposite directions from the base region 12 and two end face lugs 16 projecting in opposite directions from the base region 12. In this process, the side lugs 14 and the end face lugs 16 extend perpendicular to one another, with the extent of the side lugs 14 away from the base region 12 being dimensions much larger than the corresponding extent of the end face lugs 16. This is due to the fact that the end face lugs 14 are not only provided for partially covering the product side surfaces, but rather also for covering the product upper side for forming the first sealing region, whereas the function of the end face lugs 16 only comprises partially covering the product end faces and forming parts of the second and third sealing regions.

The base region 12 is dimensioned larger than the product lower side so that it projects beyond the lower side region 18 visible from FIG. 1a at all four sides. The lower side region 18 is drawn with solid lines in FIG. 1a and serves in the finished packaging to cover the product lower side completely. Accordingly, the lower side region 18 is dimensioned substantially as large as the product lower side, with a comparison of FIGS. 1a and 2a making clear that the lower side region 18 is substantially smaller than the base region 12.

Furthermore, two side surface regions 20 as well as two end face regions 22 can be seen from FIG. 1a which are each disposed opposite one another and which extend away from the lower side region 18 so that the lower side region 18 ultimately in turn forms, with the side surface regions 20 and the end face regions 22, a cruciform shape overall which lies completely within the cruciform shape of the packaging material 10.

The side surface regions 20 shown in FIG. 1a serve in the finished packaging to cover the two mutually oppositely disposed product side surfaces completely in each case. The end face regions 22 have a corresponding function with respect to the product end faces.

It is of importance for the production of the sealing regions in accordance with the disclosure that the side surface regions 20 as well as the end face regions 22 in accordance with FIG. 1a do not extend up to the edge of the packaging material 10 so that a spacing remains between the outer end of the side surface regions 20 or end face regions 22 and the peripheral line of the packaging material 10, the spacing being able to serve for forming the second and third sealing regions in the case of the end face regions 22 and for covering the product upper side and for forming the first sealing region in the case of the side surface regions 20.

It is possible for carrying out the packaging procedure in accordance with the disclosure to place a product to be packed with its product lower side onto the lower side region 18 of the packaging material 10 and then to move the product through a folding gate, downwardly for example, such that the side surface regions 20 and the end face regions 22 are upwardly folded as is shown in FIGS. 1b and 2b. A corresponding folding procedure is described in the already named patent application DE 10 204 055 007.7 of the applicant. It is alternatively possible to press the packaging material 10 through a folding gate by means of a punch whose dimensions correspond to the product to be packed so that the packaging material 10 is in turn given a shape in accordance with FIGS. 1b and 2b, whereupon the punch is again removed from the packaging material. In this manner, an upwardly open container in accordance with FIGS. 1b and 2b is then obtained into which the product can be introduced or injected. An injection is in particular sensible on the packaging of cream cheese. It is possible in all the named cases to press or pull the packaging material 10 through a folding gate in any desired direction with or without a product, that is, for example, both downwardly, as explained above, and upwardly or in a horizontal direction.

Figure 2:
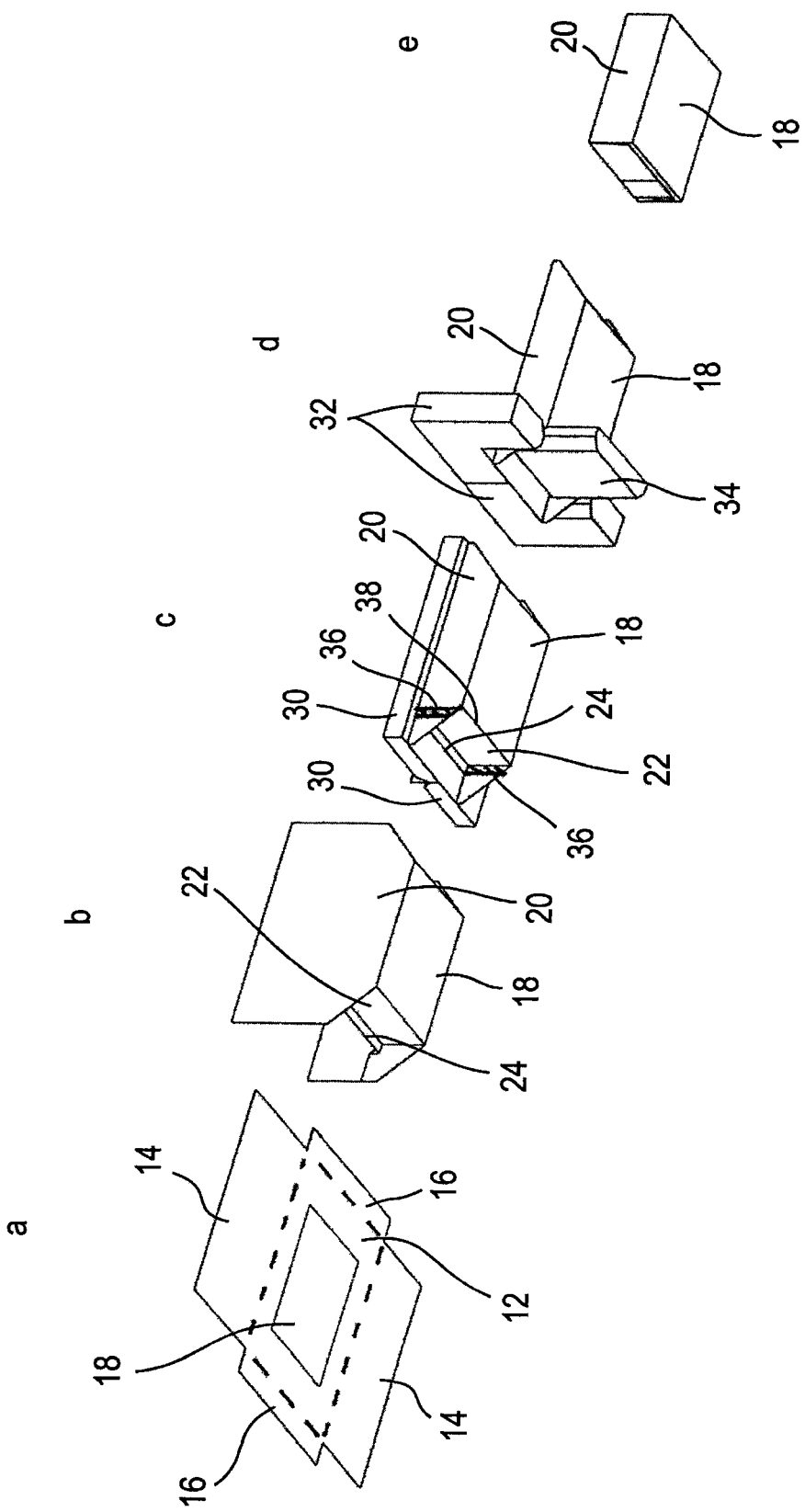

Independently of the kind of introduction of the product, a container of packaging material 10 open at one side is therefore present at the end of the process step in accordance with FIGS. 1b and 2b and a product is located in it, with the latter not being shown in FIGS. 1b and 2 for reasons of clarity. In this state, the packaging material is held with the product located therein in a receiver, not shown, in order thus to ensure sufficient stability.

The fact is important for the method described here that the regions 24 of the packaging material 10 which are visible from FIG. 1a and which are adjacent to the end face regions 22 at the outside are folded away from the product in accordance with the disclosure and thus do not come to lie on the product upper side. This folding away of the regions 24 takes place such that the regions 24 project from the product in the plane of the product upper side. In this respect, the regions 24 extend over the total width of the respective product end face. The regions 24 of the packaging material explained above can be seen particularly easily from FIGS. 1b, 2b and 2c.

Starting from the process step in accordance with FIGS. 1b and 2b, the upper side regions 26 adjacent to the side surface regions 20 at the outer side are folded toward one another by 90° in each case onto the product upper side so that they together completely cover the product upper side. In that region in which the upper side regions 26 contact the product upper side, they are upwardly folded by 90° in each case so that a sealing lug 28 comprising the end sections of the two upper side regions 26 results which projects upwardly perpendicular from the product upper side covered by packaging material. In this position, an areal contact results between packaging material projecting outwardly from the upper side regions 26 and the regions 24 which are explained above and which project outwardly from the end face regions 22.

In the explained position in accordance with FIGS. 1c and 2c, a first sealing procedure can then be carried out in accordance with FIG. 3 in that two sealing jaws 30 are moved toward one another parallel to the product upper side until the sealing lug 28 is clamped between the sealing jaws 30 and a sealing procedure can take place for forming the first sealing region in accordance with the disclosure. A corresponding sealing process is in turn described in the patent application DE 10 2004 055 007.7.

After the carrying out of the sealing process in accordance with FIGS. 1c, 2c and 3, the product upper side is sealed, the sealing jaws 30 can be removed again and the sealed sealing lug 28 can be folded onto the product upper side so that a shape of the packaging material 10 in accordance with FIGS. 1d and 2d results.

As a consequence, the second and third sealing regions in accordance with the disclosure are now produced by means of two L-shaped sealing jaws 32 and one counter-sealing jaw 34. For this purpose, the counter-sealing jaw 34, whose shape is matched to the size of the end face region 22, is moved upwardly parallel to the end face region 22 until it completely covers the end face region 22. In this position, the above-explained region 24 of the packaging material 10 contacts the upper side of the counter-sealing jaw 34. The regions 36 of the packaging material hatched in FIG. 2c furthermore also contact the side edges of the counter-sealing jaw 34. The regions 36 in this respect extend away from the product in the plane of the side surface regions 20 and extend over the total height of the end face regions 22. The two regions 36 and the region 24 are thus directly adjacent to one another and extend along three sides of the end face region 22. Consequently, the regions 24, 36 are associated with all those sides of the end face regions 22 which do not form any fold line 38 (FIG. 2c) with the lower side region 18.

As a consequence, the two L-shaped sealing jaws 32 in accordance with FIG. 4 are now moved in the direction of the counter-sealing jaw 34 until the sealing jaws 32 and the counter-sealing jaw 34 clamp the two regions 36 and the region 24 between them. A sealing procedure can then subsequently take place with which then the second sealing region in accordance with the disclosure is produced. The other end face region 22 can then be processed in a corresponding manner afterward so that the third sealing region in accordance with the disclosure is hereby created.

After producing the first, second and third sealing regions, the packaging is sealingly closed since the first sealing region extending along the sealing lug 28 directly contacts the sealed region 24 (FIG. 2c) so that the first, second and third sealing regions ultimately extend along mutually connected lines which completely seal the packaging.

In a last method step, the region of the packaging material 10 projecting outwardly beyond the upper side region 26 and the side surface regions 20 can then be folded onto the two end face regions 22 so that a compact, parallelepiped shaped and drop-tight product packaging in accordance with FIGS. 1e and 2e results.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of packaging a product with an areal packaging material positioned at outer surfaces of the product, the method comprising:

forming fold lines such that the product is completely surrounded by the packaging material, the forming of the fold lines including folding the packaging material adjacent to a lower side region while forming side surface regions and end face regions such that a container open at one side is formed;

folding first sections of the packaging material that project beyond a rim of the container open at the one side in first regions of mutually oppositely disposed product side surfaces to overlap and cover an upper side of the product until the first sections contact and seal in a first sealing region; and sealing second sections of the packaging material that project outwardly from the product in second regions of mutually oppositely disposed end face regions with third sections of the packaging material that project outwardly from the product from an upper side region and from the side surface regions of the packaging material in a second sealing region and a third sealing region;

wherein the second sealing region extends along three sides of a first of the end face regions, with the three sides being adjacent to the upper side region and to the side surface regions;

wherein the third sealing region extends along three sides of a second of the end face regions, with the three sides also being adjacent to the upper side region and to the side surface regions; and wherein at least one sealing jaw and at least one counter-sealing jaw seal the packaging material in the second and third sealing regions along the three sides of the first and second of the end face regions.

2. The method of claim 1, wherein the packaging material has a length in a first direction before the folding of the packaging material that is larger than twice a sum of a width and a height of the product; and in a second direction extending perpendicular to the first direction, the packaging material has a length that is larger than a sum of a length and twice the height of the product.

3. The method of claim 1, wherein the third sections adjacent to each of the end face regions project outwardly from the product in a plane of the upper side after producing the container open at the one side and before sealing the second and third sealing regions.

4. The method of claim 1, wherein at least one sealing jaw and at least one counter-sealing jaw seal the packaging material in the first sealing region.

5. The method of claim 1, wherein a pair of outer sealing jaws having an L shape, and the counter-sealing jaw seal the packaging in the second and third sealing regions.

6. The method of claim 1, wherein the packaging material is configured in one piece and is of cruciform shape in which two side lugs and two end face lugs respectively project in opposite directions from a base region.

7. The method of claim 6, wherein the base region is dimensioned larger than a lower side of the product.

* * * * *